United States Patent [19]
Heitkamp et al.

[11] Patent Number: 6,045,700
[45] Date of Patent: *Apr. 4, 2000

[54] RETRIEVABLE ORGANIC CARBON SCAVENGERS FOR CLEANING OF CONTAMINATED SURFACE WATER SEDIMENTS

[75] Inventors: Michael A. Heitkamp, Ballwin; Richard A. Kimerle, St. Louis, both of Mo.

[73] Assignee: Solutia Inc., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/901,994

[22] Filed: Jul. 29, 1997

Related U.S. Application Data

[60] Provisional application No. 60/022,376, Jul. 29, 1996.

[51] Int. Cl.⁷ .................................................... C02F 1/28
[52] U.S. Cl. .......................... 210/638; 210/670; 210/692; 210/694; 210/747
[58] Field of Search .................................... 210/638, 670, 210/679, 691, 692, 693, 694, 747, 502.1

[56] References Cited

U.S. PATENT DOCUMENTS

| | | | |
|---|---|---|---|
| 3,268,636 | 8/1966 | Angell | 264/51 |
| 3,327,031 | 6/1967 | Boyer et al. | 264/53 |
| 3,407,151 | 10/1968 | Overcashier et al. | 260/2.5 |
| 3,536,615 | 10/1970 | Bunn | 210/502.1 |
| 3,861,404 | 1/1975 | Changani | 131/269 |
| 4,009,105 | 2/1977 | Jeris | 210/107 |
| 4,070,426 | 1/1978 | Purvis | 264/54 |
| 4,134,831 | 1/1979 | Dawson et al. | 210/692 |
| 4,165,281 | 8/1979 | Kuriyama et al. | 210/17 |
| 4,181,513 | 1/1980 | Fukuda et al. | 55/316 |
| 4,415,454 | 11/1983 | Fuchs | 210/616 |

(List continued on next page.)

FOREIGN PATENT DOCUMENTS

| | | |
|---|---|---|
| 2029164 | 11/1990 | Canada . |
| 0121851 A2 | 10/1984 | European Pat. Off. ......... C12N 11/04 |
| 0177125 A2 | 4/1986 | European Pat. Off. .......... C02F 1/28 |
| 0186125 A2 | 7/1986 | European Pat. Off. ......... C12N 11/08 |
| 0209790 a2 | 1/1987 | European Pat. Off. .......... C02F 3/10 |
| 0467528 A2 | 1/1992 | European Pat. Off. ........... C08J 9/28 |
| 0472249 A2 | 2/1992 | European Pat. Off. .......... C02F 3/10 |
| 0623557A1 | 11/1994 | European Pat. Off. .......... C02F 1/28 |

(List continued on next page.)

OTHER PUBLICATIONS

Attaway et al., "Waste stream detoxified with immobilized microbe system," Pollution Engineering, pp. 106–108 (Sep. 1988).
Cohen, "Selective Removal of Trace Organics Using Surface Grafted Polymers,"PB89–214480 Final Technical Report, Dept. of Chem., Eng., Univ. of Calif., U.S. Geological Survey, Reston, VA, WasterResources Div., pp. i–67(Aug. 1988).
Edwards, Adams, Heitkamp; Laboratory–scale evaluation of aerobic fluidized bed reactors for the biotreatment of a synthetic, high–strength chemical industry waste stream, Water Environment Research, vol. 66, No. 1, pp. 70–83 (Jan./Feb. 1994).
Heitkamp, Camel, Reuter, Adams; Biodegradation of p–Nitrophenol in an Aqueous Waste Stream by Immobilized Bacteria, Applied and Environmental Microbiology, vol. 56, No. 10, pp. 2967–2973 (Oct. 1990).
Hickey et al., "Combined Biological Fluid Bed—Carbon Adsorption System for BTEX Contaminated Groundwater Remediation," Michigan Biotechnology Institute, Envirex Ltd., Fourth National Outdoor Action Conference on Aquifer Restoration, Groundwater Monitoring and Geophysical Methods, Los Vegas, Nevada, pp. 1–14 (May 1990).
O'Reilly et al., "Utilization of Immobilized–Bacteriato Degrade Aromatic Compounds Common to Wood–Treatment Wastewaters," Water Science Technology, vol. 20, pp. 95–100 (1988).
Portier et al., "Continuous Biodegradation and Detoxification of Chlorinated Phenols Using Immobilized Bacteria," Toxicity Assessment: An International Quarterly, vol. 1, pp. 501–513 (1986).
Tsubone, Ogaki, Yoshiy, Takahashi; Effect of biomass entrapment and carrier properties on the performance of an air–fluidized–bedbiofilm reactor; Water Environment Research. vol. 64 No. 7, pp. 884–889 (Nov./Dec. 1992).
Derwent Abstract JP 07188456, Jul. 25, 1995.
Derwent Abstract GB 2205102, Nov. 30, 1988.
Derwent Abstract JP 52–049284, Apr. 20, 1977.
Derwent Abstract GB 1466027, Mar. 2, 1977.
Derwent Abstract DE 3727271, Feb. 18, 1988.
Derwent Abstract DE 3327638, Feb. 14, 1985.
Derwent Abstract DE 2364247, Jul. 18, 1974.
Derwent Abstract JP 07109376, Apr. 25, 1995.
Derwent Abstract JP 06220715, Aug. 9, 1994.
Derwent Abstract JP 0616678, Jun. 14, 1994.
Derwent Abstract JP 05043601, Feb. 23, 1993.
Derwent Abstract JP 03185028, Aug. 13, 1991.
Derwent Abstract JP 02290229, Nov. 30, 1990.
Derwent Abstract JP 02026917, Jan. 29, 1990.
Derwent Abstract JP 06008364 B2, Feb. 2, 1994.
Derwent Abstract JP 62212463, Sep. 18, 1987.
Derwent Abstract JP 55010555 B, Mar. 17, 1980.
Derwent Abstract JP 49048748, May 11, 1974.
Derwent Abstract JP 02122894, May 10, 1990.

*Primary Examiner*—Ivars Cintins
*Attorney, Agent, or Firm*—Arnold White & Durkee

[57] ABSTRACT

A method for reducing the toxicity, bioaccumulation and concentration of chemicals in surface water sediments and water using a retrievable organic carbon scavenger is disclosed. The scavenger is comprised of a porous polymeric material, optionally containing an adsorbent such as activated carbon, and may exist in the form of beads, sheets, fibers, netting or other similar forms. The material is placed in contact with the sediment, toxic compounds are absorbed from the sediment, and may be retrieved for regeneration or disposal.

9 Claims, No Drawings

U.S. PATENT DOCUMENTS

| | | | |
|---|---|---|---|
| 4,544,594 | 10/1985 | Li et al. | 428/92 |
| 4,552,810 | 11/1985 | Norota et al. | 428/398 |
| 4,567,718 | 2/1986 | Reischl et al. | 210/616 |
| 4,876,288 | 10/1989 | Herding et al. | 521/53 |
| 4,915,884 | 4/1990 | Capdeville et al. | 264/15 |
| 4,960,549 | 10/1990 | Brooks et al. | 264/45.5 |
| 4,983,299 | 1/1991 | Lupton et al. | 210/617 |
| 5,098,577 | 3/1992 | McLaughlin et al. | 210/679 |
| 5,211,848 | 5/1993 | Friday et al. | 210/611 |
| 5,217,616 | 6/1993 | Sanyal et al. | 210/617 |
| 5,229,209 | 7/1993 | Gharapetian et al. | 428/403 |
| 5,254,254 | 10/1993 | Shin et al. | 210/611 |
| 5,256,298 | 10/1993 | Powell | 210/679 |
| 5,288,635 | 2/1994 | Adams et al. | 435/262.5 |
| 5,294,384 | 3/1994 | David et al. | 264/37 |
| 5,342,646 | 8/1994 | Kleese et al. | 427/2.1 |
| 5,397,755 | 3/1995 | Parker et al. | 502/7 |
| 5,403,487 | 4/1995 | Lodaya et al. | 210/610 |
| 5,486,292 | 1/1996 | Bair et al. | 210/679 |
| 5,507,949 | 4/1996 | Ho | 210/490 |

FOREIGN PATENT DOCUMENTS

| | | | |
|---|---|---|---|
| 0696611 A2 | 2/1996 | European Pat. Off. | C08J 9/00 |
| 0696612 A2 | 2/1996 | European Pat. Off. | C08J 9/228 |
| 63-232393 | 9/1988 | Japan | H05K 3/46 |
| 7-179645 | 7/1995 | Japan | C08J 9/16 |
| 7503298 | 3/1976 | Netherlands . | |
| 6603754 | 9/1996 | Netherlands . | |
| 1034076 | 6/1966 | United Kingdom . | |
| 1082661 | 9/1967 | United Kingdom | C02C 1/04 |
| 1318964 | 5/1973 | United Kingdom | C08G 53/08 |
| 2230278 | 10/1990 | United Kingdom | B01D 39/16 |
| WO 92/18609 | 10/1992 | WIPO | C12M 1/40 |
| WO 93/01231 | 1/1993 | WIPO | C08J 9/26 |
| WO 94/05841 | 3/1994 | WIPO | D04H 1/42 |
| WO 94/14712 | 7/1994 | WIPO | C02F 3/10 |
| WO 95/23768 | 9/1995 | WIPO | C02F 3/10 |

RETRIEVABLE ORGANIC CARBON SCAVENGERS FOR CLEANING OF CONTAMINATED SURFACE WATER SEDIMENTS

BACKGROUND OF THE INVENTION

This application claims benefit of U.S. provisional application Ser. No. 60/022,376, filed on Jul. 29, 1996.

1. Field of the Invention

The present invention relates generally to the removal or mitigation of toxicity and bioconcentration potential of chemicals in water sources or sediments. More particularly it concerns the removal or mitigation of toxics from surface water sediments interstitial water and the water column using porous polymeric materials as the chemical scavenger. A particularly useful aspect of this invention is the ability to recover the polymeric material from the sediment so that the material is designated a Retrievable Organic Carbon Scavenger (ROCS).

The discharge and accidental spillage of industrial pollutants into surface waters has created a toxicity and residue problem for the organisms that live in those waters, and for the higher organisms that rely upon them as part of the food chain. Of particular interest to environmental regulatory authorities are the organic and metallic pollutants, generally hydrophobic, that tend to settle into the sediment at the bottom of these surface waters where they may remain for long periods of time and function as a source of chemical exposure to the surface waters. These pollutants are not easily removed by natural water flow, because of their location in the sediment. Current methods for removing sediment pollutants include dredging and capping the sediment. Dredging resuspends and further disperses the contaminants and produces large amounts of contaminated mud which poses a disposal problem. Furthermore, runoff from land disposal of dredged materials may damage natural surface water environments. Alternatively, capping the sediment merely traps the pollutants in the sediment, and poses a long-term problem of assuring that the pollutants remain capped despite erosion and other activity affecting the bottom sediment.

Thus, there is a need to effectively mitigate sediment toxicity to safely remove pollutants from surface water sediment without disturbing the surface water environment. The medium used as a chemical scavenger is preferably retrievable, so that the toxic chemical compounds can be removed from the site and no longer cause a threat to the surface water environment.

2. Description of Related Art

Activated carbon is well-known to be useful for removing impurities from air, water, and other solvents because of chemical adsorption attributable to its very high microporous surface area. In large industrial systems, beds of loose activated carbon are commonly used for removing impurities from gaseous and liquid streams. U.S. Pat. No. 4,181,513 describes the manufacture of an adsorptive filter material made from fibrous activated carbon. It is also well-known that polymeric materials are useful for removing contaminants from aqueous media. The use of polyamide polymers such as nylons to remove organometallic compounds from aqueous media is described in European Patent Application No. EP 0 177 125 A2.

A combination of porous polymeric fibrids and activated carbon to remove impurities from air and water is described in PCT Application WO 94,05841, wherein high levels of activated carbon are preferred, e.g. 40 to 85%. That application describes the high $CCl_4$ adsorptive capacity of such synthetic fibrids with activated carbon, and discloses the use of such materials as a filter to remote impurities from solvents. The application does not discuss the purification of surface waters or bottom sediments.

One known method for treating surface water sediment is disclosed in European Patent No. EP 0 623557 A1, issued to Rohm and Haas Company. That patent discloses a method for sequestering hydrophobic organic materials in surface water sediment by treating the sediment with partially pyrolyzed carbonaceous adsorbents having at least 85% by weight of carbon. This method is different from capping the sediment, because the pollutants reportedly become absorbed onto the organic carbon of the resin material and will not contact the living organisms in the sediment. However, the adsorbents used are not intended to be removed, and remain in the sediment.

SUMMARY OF THE INVENTION

The present invention addresses the above problems by providing a retrievable organic carbon scavenger (ROCS) that is used to reduce the toxicity, bioaccumulation, and/or concentration of chemicals from surface water sediment and the water column. The ROCS is comprised of a porous polymeric material, that is placed in contact with the sediment so that the toxic compounds adsorb onto the polymeric material. When a chemical equilibrium is reached, the ROCS may be easily removed from the sediment, cleaned, and further processed for chemical destruction or disposal. In a preferred embodiment of this invention, the ROCS material comprises a foamed nylon formulated with adsorbents, such as activated carbon, and which is readily retrievable. In other embodiments the ROCS material may comprise other chemical adsorbents such as polyvinyl butyral sheeting or polybutylene glycol in a porous polymeric support. The ROCS may be in the form of beads, sheets, fibers, netting, or webbing to enable easier emplacement, contact with sediments and recovery of the material from the sediment.

DESCRIPTION OF ILLUSTRATIVE EMBODIMENTS

The present invention provides a method for removing toxic and bioaccumulation chemicals from surface water sediment using a retrievable organic carbon scavenger (ROCS). The ROCS material is formed generally from porous polymeric material, preferably embedded with an adsorbent such as activated carbon to provide the desired characteristics of chemical adsorption. The material may be formed into small pellets, or formed into large sheets, fibers, netting or similar forms for easier retrieval from the sediment. Once a substantial amount of toxic chemicals have been adsorbed onto the ROCS, the product can be removed from the sediment for treatment. The adsorbed chemicals may be disposed of by conventional technologies, such as biodegradation or incineration.

ROCS are constructed of any tough, porous polymeric materials that are resistant to physical, chemical, and microbial breakdown in the surface water medium, and are capable of being formulated with chemical adsorbents, and, optionally, inorganic fillers and fiber reinforcement. The polymeric materials useful in the invention include nylon, thermoplastic polyester, ethylene-vinyl acetate copolymer, ethylene-vinyl alcohol copolymer, polysulfone, polyolefin, polyvinyl chloride, polycarbonate, polyamide, polyetherketone, polyphenylenesulfide, cellulose ester plastics, polyvinyl butyral, styrenic polymers, rigid thermoplastic polyurethanes, and mixtures thereof. The adsorbents useful in the invention may be solids or oligomeric or polymeric organic liquids, and can be formulated into the polymeric material by conventional methods known to those of skill in the art. The solid adsorbents useful in the invention include carbon (including charcoal, activated carbon, graphite and carbon black), ion exchange resins, zeolites and mixtures thereof. The liquid adsorbents useful in the invention are essentially water insoluble and water immiscible and include polyalkylene oxides, particularly polypropylene glycols, polybutylene glycols, polytetramethylene glycols, polyesters, polyureas, polyurethanes, silicone oils (such as polydimethyl siloxanes). and the like. The liquid adsorbents are readily available and are described in U.S. Pat. No. 5,507,949, which is incorporated by reference herein. The inorganic fillers useful in the invention include carbonates such as calcium carbonate and barium carbonate, silicates such as clay (kaolin), calcium silicate, mica, talc, and wollastonite, sulfates such as calcium sulfate and barium sulfate, and oxides such as silicon dioxide and titanium dioxide. The fiber reinforcement useful in the invention include fibers selected from the group consisting of glass, carbon, aramid, fiber-forming, inorganic material selected from alumina, silica, boron, boron nitride, boron carbide, silicon carbide or aluminum silicate, and mixtures thereof. The polymeric materials, solid adsorbent, inorganic fillers and fiber reinforcements are readily available and are described in U.S. Patent application Ser. No. 60/004,764, which is incorporated by reference herein.

Currently preferred polymeric materials include nylon, polyvinyl butyral and a porous, polymeric support containing an appropriate organic polymeric liquid adsorbent, such as polybutylene glycol. Suitable porous polymeric supports for use with the liquid adsorbent are described in U.S. Pat. No, 5,507,049. For experimental purposes, the ROCS have been formed a small beads. In commercial or field use the material is preferably formulated into sheets, netting, or forms that can be easily contacted with the sediment and easily retrieved. The preferred forms of the material are produced by conventional polymer processing technology which is readily known to those of skill in the art.

The most preferred embodiment is a very porous, highly foamed thermoplastic, such as nylon, composed of about 3 to about 25 wt % of an adsorbent such as activated carbon. The foamed nylon, which can be prepared from recycled nylons, is particularly advantageous due to its high surface area which greatly enhances the kinetics of chemical contaminant removal from the sediment. The porous polymeric material can be prepared by extruding in a non-vented extruder a composition comprising nylon, and, optionally, adsorbent material, inorganic filler and fiber reinforcement, in the presence of about 0.2 to about 5 wt % (based on the weight of the total composition) of water, a foaming agent or mixtures thereof, and cooling the extrudate. For example, the extrudate from the extruder can be pelletized to produce pellets or beads. The extruder die can also be selected such that the extrudate from the extruder is in the form of sheets or fibers. Foaming occurs from the vaporization of the water or foaming agent in the extrudate due to a large pressure drop as it passes through the extruder die. The composition to be extruded is prepared by mixing or blending the composition in any conventional polymer compounding blender. The temperature and pressure used in the extruder will depend on the particular material being extruded and will be readily apparent to those of ordinary skill in the art.

In addition, the type and size extruder used will be readily apparent to those of ordinary skill in the art. A single screws extruder is currently preferred.

Since this material is produced from melted dope, it is easy to add additional components to the melted dope in order to change the characteristics of the final product. For instance, an iron particle added to the material could enable its removal from sediment by magnetic means, and zeolites may be added to the material to enhance the adsorption of metal toxins. In addition, this overall process offers great flexibility in changing the physical characteristics of the nylon beads (size, density, porosity, shape, and type of adsorbent).

Reduction in the adverse effects of the sediment chemical contaminant is affected through chemical partitioning. Non-polar organic chemicals and toxic metal compounds will adsorb to the organic carbon embedded in the ROCS material. With some ROCS material, such as polyvinylbutyral, it has been found that adsorption will take place even without the addition of activated carbon to the material. The toxic chemical contaminants will be adsorbed by the carbon in the ROCS. Over a period of time a substantial portion of the toxic chemicals will be adsorbed onto the ROCS, thus reducing the concentration of toxics in the interstitial waters and exposure of chemical contaminants to aquatic organisms. Once significant partitioning of the chemical contaminants has occurred, the ROCS material can be removed from the aquatic environment for disposal. This process can be repeated as needed until the sediment has reached the desired level of toxicity.

Once formulated, the ROCS material is contacted with the sediment by any convenient technique, including the relatively simple method of casting the ROCS onto the surface of the water and allowing it to settle onto the sediment. The ROCS may be allowed to remain in the sediment for any length of time, including several weeks or months, preferably until an equilibrium has been reached and the chemical adsorption has been maximized. Simple experimentation will reveal the optimum contact time of the selected ROCS material with the sediment.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes, can be made in the specific embodiments which are disclosed and still obtain a like or similar result without departing from the spirit and scope of the invention.

EXAMPLE 1

Three types of ROCS materials were tested for their ability to remove Kepone from a contaminated sediment sample. A sediment sample containing approximately 30 ppm Kepone was prepared. The sediment was obtained from the Environmental Services Center, Monsanto Company, St. Louis, Mo. To prepare the sediment, Kepone was added to a reference soil from St. Charles County, Missouri, Missouri River flood plain. Samples of the control sediment and the contaminated sediment were saturated with water. The dilution water was a mixture of 20% Perrier water and 80% de-ionized water. The water was air sparged overnight to remove the carbonation.

Separate containers were used to test each type of ROCS material. The ROCS materials tested were: 1) Nylon 6,6 porous beads with 3 wt % graphite carbon prepared according to U.S. Patent application Ser. No. 60/004,764: 2) Saflex® Polyvinylbutyral (PVB); and 3) A commercially available hollow fiber membrane was saturated with polybutylene glycol (PBG) (prepared by the Environmental Services Center, Monsanto Company).

All three materials where tested for their ability to remove kepone from the sediment sample. 250 ml glass beakers were prepared using the kepone sediment and water. The various ROCS beads were placed on top of the sediment, and allowed to reach equilibrium over a 16 week span. The following table shows the kepone reduction using each material over the 16 week period.

| ROCS material | Initial Conc. (ppm Kepone) | Time 2 weeks (ppm Kepone) | Time 4 weeks (ppm Kepone) | Time 8 weeks (ppm Kepone) | Time 16 weeks (ppm Kepone) |
|---|---|---|---|---|---|
| Nylon Beads | 31.5 | 14.2 | 12.4—1.8 | 11.5 | 9.4—0.2 |
| Polyvinyl Butyral | 31.5 | 24.9 | 19.3—2.0 | 15.1 | 19.5—1.3 |
| Polybutylene Glycol | 31.5 | 23.2 | 24.3—2.3 | 22.0 | 20.2—1.0 |
| Control | 31.5 | 32.3 | 28.4—1.3 | 25.9 | 25.5—2.2 |

The nylon beads were the best material, reducing the Kepone concentration from 31.5 ppm to 9.4 ppm over a 16 week span (70% reduction), while the polyvinyl butyral reduced the concentration 38% and the polybutylene glycol by 36%. However, the addition of activated carbon to the PVB and PBG materials should improve their performance.

EXAMPLE 2

For a second experiment, three types of sediments were tested for the ability of the porous nylon beads to reduce toxicity to *Daphnia magna* in surface water having contaminated sediment. For this experiment, the nylon beads similar to those described in Example 1 were embedded with 25% wt. graphite carbon. The three sediment samples were: 1) a control sample with "clean" sediment; 2) A kepone contaminated sediment similar to that used in Example 1; and 3) a sediment contaminated with approximately 121 ppm DDT, obtained from the Environmental Protection Agency laboratory in Duluth, Minn. To prepare the sediment samples, 50 grams of centrifuged sediment were placed in a 400 ml beaker. Next, 250 ml of dilution water were added. The contents were stirred and then allowed to settle for 24 hours. The water in each beaker was sampled at given intervals and tested for toxicity to *Daphnia magna*. As soon as toxicity appeared in a sample, the test was started with the ROCS material.

To test the ROCS, the contents of the toxic beaker as split between two 250 ml beakers, and allowed to settle for 4 hours. After rinsing the ROCS beads with water, they were added to one beaker in a 1:1 ratio, weight, with the wet sediment. The other beaker was used to continue tracking increased toxicity. Toxicity experiments were performed demonstrating that the control sediment and the nylon/ carbon beads were not themselves toxic to *Daphnia magna*.

For the Kepone sample, toxicity appeared after just one day. For the DDT sample, toxicity appeared after four days. The tables below demonstrate the results of treating the two samples with ROCS. After the sediments were treated with the nylon porous beads for two days, the toxicity to *Daphnia magna* was completely eliminated. In an additional experiment, when the ROCS beads to wet sediment ratio was 1:4, identical results were obtained in that all toxicity was eliminated. The results of the toxicity tests are set forth below:

Toxicity Results From Contaminated Kepone (30 ppm) Sediment With And Without ROCS (ROCS Were Added After Allowing Desorption To Occur For Four Days.)

| DAY SAMPLED | DAPHNIA MAGNA TOXICITY (WITHOUT ROCS) #Dead/#Added | | DAPHNIA MAGNA TOXICITY (WITH ROCS) #Dead/#Added | |
|---|---|---|---|---|
| | 24 HR | 48 HR | 24 HR | 48 HR |
| 1 | 1/5 | 5/5 | | |
| 2 | 2/5 | 5/5 | 0/5 | 0/5 |
| 4 | 3/5 | 5/5 | 0/5 | 0/5 |
| 8 | 5/5 | 5/5 | | |

Toxicity Results From Contaminated DDT (121 ppm) Sediment With And Without ROCS (ROCS Were Added After Allowing Desorption To Occur for Eight Days.)

| DAY SAMPLED | DAPHNIA MAGNA TOXICITY (WITHOUT ROCS) #Dead/#Added | | DAPHNIA MAGNA TOXICITY (WITH ROCS) #Dead/#Added | |
|---|---|---|---|---|
| | 24 HR | 48 HR | 24 HR | 48 HR |
| 1 | 0/5 | 0/5 | | |
| 2 | 0/5 | 2/5 | 0/5 | 0/5 |
| 4 | 3/5 | 5/5 | | |
| 6 | | | 0/5 | 0/5 |
| 8 | 0/5 | 5/5 | | |
| 15 | 1/5 | 5/5 | | |

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein awhile the same or similar results would be achieved. All such similar substitutes and modifications apparent to those skilled in the art are deemed to be within the spirit, scope and concept of the invention as defined by the appended claims.

What is claimed is:

1. A method for reducing toxicity, bioaccumulation potential, and concentration of chemicals in surface water sediments and a water column which comprises:

contacting the surface water sediment or the water column above said sediment with a porous polymeric material so that toxic compounds adsorb onto the porous polymeric material; and recovering the porous polymeric material from the surface water sediment or the water column above said sediment;

wherein said porous polymeric material is selected from the group consisting of polyvinyl butyral and foamed nylon.

2. The method of claim 1 wherein the porous polymeric material contains an adsorbant.

3. The method of claim 2 wherein the adsorbent is activated carbon.

4. The method of claim 2 wherein the adsorbent is a zeolite.

5. The method of claim 2, wherein the porous polymeric material comprises about 3 wt % to about 25 wt % of adsorbent.

6. The method of claim 1 wherein the recovered porous polymeric material is regenerated to remove the toxic materials.

7. The method of claim 1 wherein the porous polymeric material is foamed nylon.

8. The method of claim 1, wherein the porous polymeric material is polyvinyl butyral.

9. A method for reducing toxicity, bioaccumulation potential, and concentration of chemicals in surface water sediments and a water column which comprises:

contacting the surface water sediment or the water column above said sediment with a porous polymeric material so that toxic compounds adsorb onto the porous polymeric material; and recovering the porous polymeric material from the surface water sediment or the water column above said sediment;

wherein the porous polymeric material is a porous membrane which contains a liquid hydrocarbon polymer.

* * * * *

UNITED STATES PATENT AND TRADEMARK OFFICE
CERTIFICATE OF CORRECTION

PATENT NO. : 6,045,700
DATED : April 4, 2000
INVENTOR(S) : Michael A. Heitkamp, et. al.

It is certified that error appears in the above-identified patent and that said Letters Patent is hereby corrected as shown below:

Column 3, line 37, delete "No. 5,507,049" and insert --No. 5,507,949--

Column 5, line 40, delete "25%" and insert --25.5%--

Column 5, line 55, delete "4" and insert -- 24--.

Signed and Sealed this

Sixth Day of February, 2001

Attest:

Q. TODD DICKINSON

Attesting Officer

Director of Patents and Trademarks